United States Patent
Iijima et al.

(10) Patent No.: US 8,663,363 B2
(45) Date of Patent: Mar. 4, 2014

(54) $CO_2$ RECOVERING APPARATUS AND METHOD

(75) Inventors: Masaki Iijima, Tokyo (JP); Hiroshi Tanaka, Tokyo (JP); Yoshiki Sorimachi, Tokyo (JP); Masahiko Tatsumi, Hyogo (JP); Yasuyuki Yagi, Hyogo (JP); Kouki Ogura, Hyogo (JP)

(73) Assignees: Mitsubishi Heavy Industries, Ltd., Tokyo (JP); The Kansai Electric Power Co., Inc., Osaka (JP)

( * ) Notice: Subject to any disclaimer, the term of this patent is extended or adjusted under 35 U.S.C. 154(b) by 382 days.

(21) Appl. No.: 12/649,928

(22) Filed: Dec. 30, 2009

(65) Prior Publication Data

US 2010/0319531 A1    Dec. 23, 2010

(30) Foreign Application Priority Data

| Jun. 17, 2009 | (JP) | 2009-144587 |
| Jun. 17, 2009 | (JP) | 2009-144588 |
| Jun. 23, 2009 | (JP) | 2009-149031 |
| Jun. 23, 2009 | (JP) | 2009-149032 |

(51) Int. Cl.
*B01D 53/14* (2006.01)

(52) U.S. Cl.
USPC ............. 95/8; 95/13; 95/14; 95/16; 95/236; 95/244; 95/251

(58) Field of Classification Search
USPC .......... 95/8, 11, 13, 14, 16, 236; 96/244, 251, 96/157
See application file for complete search history.

(56) References Cited

U.S. PATENT DOCUMENTS 3,958,943 A * 5/1976 Carmassi et al. .......... 422/108
4,106,916 A * 8/1978 Tuckett et al. ............ 95/21
4,289,738 A    9/1981 Pearce et al.
4,491,566 A    1/1985 Adams et al.
5,085,839 A * 2/1992 Scott et al. ............ 423/210
5,102,805 A    4/1992 Baughman et al.
2007/0212286 A1  9/2007 Shah et al.

FOREIGN PATENT DOCUMENTS

| CA | 1106030 A1 | 7/1981 |
| CA | 2719339 A1 | 10/2009 |

(Continued)

OTHER PUBLICATIONS

European Search Report dated Feb. 24, 2011, issued in corresponding European Patent Application No. 10151152.5.
Canadian Office Action dated May 31, 2011, issued in corresponding Canadian Patent Application No. 2,689,453.

(Continued)

*Primary Examiner* — Duane Smith
*Assistant Examiner* — Phillip Shao
(74) *Attorney, Agent, or Firm* — Westerman, Hattori, Daniels & Adrian, LLP

(57) ABSTRACT

A $CO_2$ recovering apparatus includes: a $CO_2$ absorber that brings flue gas containing $CO_2$ into contact with $CO_2$ absorbent to reduce the $CO_2$ contained in the flue gas; a regenerator that reduces $CO_2$ contained in rich solvent that has absorbed $CO_2$ in the $CO_2$ absorber to regenerate the rich solvent, so that the $CO_2$ absorbent that is lean solvent having $CO_2$ reduced in the regenerator is reused in the $CO_2$ absorber; and a controller that controls to detect the absorbent concentration in the $CO_2$ absorbent, to increase the volume of $CO_2$ absorbent to be circulated based on a decrease in the absorbent concentration, and to adjust the volume of steam to be supplied in the regenerator based on the volume of the $CO_2$ absorbent to be circulated.

10 Claims, 6 Drawing Sheets

(56) References Cited

FOREIGN PATENT DOCUMENTS

| | | |
|---|---|---|
| EP | 0 537 593 A1 | 4/1993 |
| EP | 1 900 415 A1 | 3/2008 |
| GB | 2 100 471 A | 12/1982 |
| JP | 53-52284 A | 5/1978 |
| JP | 3-193116 A | 8/1991 |
| JP | 4-265115 A | 9/1992 |
| JP | 5-031325 A | 2/1993 |
| JP | 6-154554 A | 6/1994 |
| JP | 10-165761 A | 6/1998 |
| JP | 10-202053 A | 8/1998 |
| JP | 10-202054 A | 8/1998 |
| JP | 11-137960 A | 5/1999 |
| JP | 2001-252524 A | 9/2001 |
| JP | 2003-93835 A | 4/2003 |
| JP | 2003-327981 A | 11/2003 |
| WO | 01/05489 A1 | 1/2001 |
| WO | 2009/104744 A1 | 8/2009 |

OTHER PUBLICATIONS

Partial European Search Report dated Sep. 14, 2010, issued in corresponding European Patent Application No. 10151152.5.

Australian Office Action Sep. 7, 2010, issued in corresponding Australian Patent Application No. 2010200176.

Japanese Office Action dated Sep. 18, 2012, issued in corresponding Japanese Patent Application No. 2009-144587, (3 pages). With English Translation.

Japanese Office Action dated Sep. 18, 2012, issued in corresponding Japanese Patent Application No. 2009-149031, (3 pages). With English Translation.

Japanese Office Action dated Sep. 18, 2012, issued in corresponding Japanese Patent Application No. 2009-149032, (5 pages). With English Translation.

Notice of Allowance dated Mar. 5, 2013, issued in corresponding Japanese Patent Application No. 2009-144587, Partial English Translation (2 pages).

* cited by examiner

CO₂ RECOVERING APPARATUS AND METHOD

TECHNICAL FIELD

The present invention relates to a $CO_2$ recovering apparatus and a $CO_2$ recovering method for keeping the volume of steam to be used for regenerating $CO_2$ absorbent at an optimal level, and keeping the volume of $CO_2$ recovered constant under an optimal condition.

BACKGROUND ART

It has come to be pointed out that one of the causes of the global warming is a greenhouse effect of $CO_2$, and it has became an urgent task, also internationally, to provide a countermeasure for $CO_2$ to protect the global environment against the warming. $CO_2$ is generated by any human activities combusting fossil fuels, and there are increasing demands for suppressing $CO_2$ emissions. Along with such an increasing demand, researchers are energetically investigating a method for reducing and recovering $CO_2$ included in flue gas, to apply in a power plant that consumes a large amount of fossil fuels, such as a thermal plant. In such a method, flue gas emitted from a steam generator is brought into contact with an amine-based $CO_2$ absorbent to allow such absorbent to absorb the $CO_2$, and the recovered amine $CO_2$ is stored therein without being released into the air. As processes for reducing and recovering $CO_2$ from the flue gas using the $CO_2$ absorbent, Japanese Patent Application Laid-open No. H3-193116, for example, brings flue gas into contact with the $CO_2$ absorbent in an absorber, heats an absorbent that has absorbed $CO_2$ in a regenerator, isolates $CO_2$ as well as regenerates the absorbent, and circulates the absorbent back to the absorber and reuses the absorbent therein.

FIG. 9 is a schematic of an example of a conventional $CO_2$ recovering apparatus. As shown in FIG. 9, a conventional $CO_2$ recovering apparatus 100 as mentioned above includes a flue gas cooler 14, a $CO_2$ absorber 16, and a regenerator 18. The flue gas cooler 14 cools flue gas 12 containing $CO_2$ and $O_2$ emitted from an industrial combustion facility 11, such as a steam generator or a gas turbine, with cooling water 13. The $CO_2$ absorber 16 further includes a $CO_2$ recovering unit 16A. The $CO_2$ recovering unit 16A brings the flue gas 12, containing the cooled $CO_2$, into contact with $CO_2$ absorbent (hereinafter, also referred to as "absorbent") 15 that absorbs $CO_2$, to reduce $CO_2$ in the flue gas 12. The regenerator 18 causes $CO_2$ absorbent (hereinafter, also referred to as "rich solvent") 17 that has absorbed $CO_2$ to release $CO_2$ to regenerate the $CO_2$ absorbent.

In the $CO_2$ recovering apparatus 100, the regenerated $CO_2$ absorbent (hereinafter, this absorbent is also referred to as "lean solvent") 15 having $CO_2$ reduced in the regenerator 18 is reused in the $CO_2$ absorber 16 as the $CO_2$ absorbent.

By a $CO_2$ recovering method using the $CO_2$ recovering apparatus 100, a flue gas booster fan 20 raises the pressure of the flue gas 12 emitted from an industrial combustion facility such as a steam generator or a gas turbine and containing $CO_2$. The flue gas 12 is then sent into the flue gas cooler 14, cooled by way of the cooling water 13, and then sent into the $CO_2$ absorber 16.

The $CO_2$ absorber 16 then brings the flue gas 12 in a counter-current contact with the $CO_2$ absorbent 15 that is based on amine-based solvent, allowing the $CO_2$ absorbent 15 to absorb the $CO_2$ contained in the flue gas 12 by way of chemical reaction.

A washing unit 16B, included in the $CO_2$ absorber 16, brings the flue gas having $CO_2$ reduced in the $CO_2$ recovering unit 16A into a gas-liquid contact with circulating condensate water 19. The condensate water 19 contains the $CO_2$ absorbent, and is supplied via a nozzle included in a washing unit 16B. In this manner, the $CO_2$ absorbent 15 that has accompanied the flue gas having $CO_2$ reduced is recovered. Flue gas 12 having $CO_2$ reduced is released out of the system.

A rich solvent pump 22 increases the pressure of the rich solvent that is the $CO_2$ absorbent 17 that has absorbed $CO_2$. Then, a rich/lean solvent heat exchanger 23 heats the rich solvent by way of the recovered $CO_2$ absorbent 15 that is lean solvent regenerated by the regenerator 18, and supplied into the regenerator 18.

The rich solvent 17 discharged into the regenerator 18 from the top thereof causes an endothermic reaction, thus releasing a majority of $CO_2$. The $CO_2$ absorbent that has released some or a majority of $CO_2$ in the regenerator 18 is called semi-lean solvent. By the time the semi-lean solvent reaches the bottom of the regenerator 18, almost all of the $CO_2$ is removed, turning the semi-lean solvent into the absorbent 15. A regenerating heater 24 then heats the lean solvent by way of steam 25, supplying steam inside the regenerator 18.

$CO_2$ gas 26 is guided out from the top of the regenerator 18, together with the steam that has been released from the rich solvent and semi-lean solvent in the regenerator 18. A condenser 27 then condenses steam contained in the $CO_2$ gas 26, and a separation drum 28 separates water from the $CO_2$ gas 26. The $CO_2$ gas 26 is then released out of the system, and recovered separately. The recovered $CO_2$ gas 26 is injected into an oilfield using enhanced oil recovery (EOR) method, or stored in an aquifer as a countermeasure for global warming.

The water separated in the separation drum 28 is pumped up to the top of the regenerator 18 by way of a condensed-water circulating pump 29. The rich/lean solvent heat exchanger 23 cools the regenerated $CO_2$ absorbent (lean solvent) 15 by way of the rich solvent 17. A lean solvent pump 30 then increases the pressure of the lean solvent 15. After being cooled down by a lean solvent cooler 31, the lean solvent 15 is supplied into the $CO_2$ absorber 16.

In FIG. 9, the reference numeral 11a denotes to a flue for the flue gas 12; the reference numeral 11b denotes to a stack; and the reference numeral 32 denotes to steam-condensed water. The $CO_2$ recovering apparatus 100 may be either added to an existing flue gas source to recover $CO_2$, or installed with a flue gas source that is to be newly installed. A door that can be opened and closed is attached on the stack 11b. The door is closed while the $CO_2$ recovering apparatus is operating, and opened while the flue gas source is operating but the $CO_2$ recovering apparatus is not operating.

If the $CO_2$ recovering apparatus is kept running, recovering $CO_2$ and consuming the $CO_2$ absorbent, the concentration of the absorbent drops. Because the concentration reduction is by approximately 10 percent, according to a conventional technology, high concentration absorbent is added as appropriate.

When the volume of the flue gas and the $CO_2$ concentration in the flue gas change, an operator needs to manually measure concentrations and flow rates at individual parts of the whole process, for example, the volume of the flue gas, the concentration of carbon dioxide contained in the flue gas, and the flow rate, the concentration, and pH of the absorbent, to determine an appropriate absorbent concentration and a ratio between the absorbent and the flue gas.

Therefore, when the $CO_2$ concentration in the flue gas changes greatly, the volume of steam consumed (specific energy consumption) per unit volume of $CO_2$ recovered also fluctuates greatly. Even when the carbon dioxide concentration in the flue gas does not change to a large extent, a $CO_2$ absorbing ratio could fluctuate due to varying absorbent regeneration ratios. Such fluctuations have been a problem in a perspective of stable operations and the amount of energy consumed.

As suggested in Japanese Patent Application Laid-open No. H10-165761, a computer and a controller have been used to determine the flow rate of carbon dioxide contained in the flue gas based on the flow rate of the flue gas and the carbon dioxide concentration in the flue gas; to adjust the flow rate of regenerated amine absorbent to be supplied into the carbon dioxide absorber to a constant level with respect to the flow rate of the carbon dioxide; to adjust the ratio between the flow rate of the steam in the heater and that of the amine-based absorbent to a constant level; and to reduce the volume of steam required for recovering a weight unit of recovered carbon dioxide.

CITATION LIST

Patent Literature

PATENT LITERATURE 1 Japanese Patent Application Laid-open No. H3-193116
PATENT LITERATURE 2 Japanese Patent Application Laid-open No. H 10-165761

SUMMARY OF INVENTION

Technical Problem

Although the concentration of the $CO_2$ absorbent gradually decreases after recovery of $CO_2$ over a long period of time, such a decrease in the concentration of the absorbent is not taken into account in suggestions such as one disclosed in Japanese Patent Application Laid-open No. H10-16576. As a consequence, the $CO_2$ recovery performance becomes deteriorated, and the volume of steam cannot be kept at an optimal level.

In other words, because an amine solvent that is an absorbent is diluted to prepare the $CO_2$ absorbent and the amine solvent in the $CO_2$ absorbent is consumed over a long-time operation, the concentration of the $CO_2$ absorbent decreases. As a result, a desired $CO_2$ absorbing ratio cannot be constantly achieved.

For recovery of $CO_2$ over a long period of time, operation with less regeneration energy consumed in regenerating the absorbent is required to maintain the volume of $CO_2$ recovered at a constant level.

Furthermore, for recovery of $CO_2$ over a long period of time, optimal operation is required to maintain the volume of $CO_2$ recovered at a constant level.

Moreover, as a countermeasure against global warming, a constant recovery rate of emitted $CO_2$ is required in recent years. Therefore, for recovery of $CO_2$ over a long period of time, an optimal operation is required while keeping the $CO_2$ recovery rate constant (e.g., the $CO_2$ recovery rate of 90 percent).

The present invention is made in consideration of the above, and an object of the present invention is to provide a $CO_2$ recovering apparatus and method that can recover a constant volume of $CO_2$ under an optimal condition, and keep the volume of $CO_2$ recovered per day at a predetermined level, without decreasing the concentration of the $CO_2$ absorbent.

Solution to Problem

According to an aspect of the present invention, a $CO_2$ recovering apparatus including a $CO_2$ absorber that brings flue gas containing $CO_2$ into contact with $CO_2$ absorbent to reduce $CO_2$ contained in the flue gas, and a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, includes: a controller that controls to detect an absorbent concentration in the $CO_2$ absorbent, to increase or decrease a volume of the $CO_2$ absorbent to be circulated based on a decrease or an increase in the absorbent concentration, and to adjust a volume of steam to be supplied in the regenerator based on the volume of the $CO_2$ absorbent to be circulated.

According to another aspect of the present invention, a $CO_2$ recovering method by using a $CO_2$ absorber that brings flue gas containing $CO_2$ into contact with $CO_2$ absorbent to reduce $CO_2$ contained in the flue gas, and a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, includes: controlling to detect an absorbent concentration in the $CO_2$ absorbent, to increase or decrease a volume of the $CO_2$ absorbent to be circulated based on a decrease or an increase in the absorbent concentration, and to adjust a volume of steam to be supplied in the regenerator based on the volume of the $CO_2$ absorbent to be circulated.

According to still another aspect of the present invention, a $CO_2$ recovering apparatus including a $CO_2$ absorber that brings flue gas containing $CO_2$ into contact with $CO_2$ absorbent to reduce $CO_2$ contained in the flue gas, and a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, includes: a controller that controls to detect a temperature of gas guided into the $CO_2$ absorber, to decrease or increase a circulation rate of the $CO_2$ absorbent based on a change in a detected temperature, and to adjust a volume of steam to be supplied in the regenerator based on the volume of the $CO_2$ absorbent to be circulated.

According to still another aspect of the present invention, a $CO_2$ recovering method by using a $CO_2$ absorber that brings flue gas containing $CO_2$ into contact with $CO_2$ absorbent to reduce $CO_2$ contained in the flue gas, and a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, includes: controlling to detect a temperature of gas guided into the $CO_2$ absorber, to decrease or increase a circulation rate of the $CO_2$ absorbent based on a change in a detected temperature, and to adjust a volume of steam to be supplied in the regenerator based on the volume of the $CO_2$ absorbent to be circulated.

According to still another aspect of the present invention, a $CO_2$ recovering apparatus including a $CO_2$ absorber that brings flue gas containing $CO_2$ into contact with $CO_2$ absorbent to reduce $CO_2$ contained in the flue gas, a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, includes: a controller that controls to measure a $CO_2$ concentration, to determine a volume of the flue gas for achieving a target volume of $CO_2$ recovered based on the $CO_2$ concentration, to determine a volume of the $CO_2$ absorbent to be circulated based on a determined volume of the flue gas, and to determine a volume of steam based on the volume of the $CO_2$ absorbent to be circulated.

According to still another aspect of the present invention, a $CO_2$ recovering method by using a $CO_2$ absorber that brings flue gas containing $CO_2$ into contact with $CO_2$ absorbent to reduce $CO_2$ contained in the flue gas, a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, includes: controlling to measure a $CO_2$ concentration, to determine a volume of the flue gas for achieving a target volume of $CO_2$ recovered based on the $CO_2$ concentration, to determine a volume of the $CO_2$ absorbent to be circulated based on a determined volume of the flue gas, and to determine a volume of steam based on the volume of the $CO_2$ absorbent to be circulated.

According to still another aspect of the present invention, a $CO_2$ recovering apparatus including a $CO_2$ absorber that brings flue gas containing $CO_2$ into contact with $CO_2$ absorbent to reduce $CO_2$ contained in the flue gas, a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, includes: a controller that controls to measure a $CO_2$ concentration and a volume of the flue gas, to determine a volume of the $CO_2$ absorbent to be circulated for achieving a target $CO_2$ recovery rate based on the volume of flue gas and the $CO_2$ concentration; and to determine a volume of steam based on a determined volume of the $CO_2$ absorbent to be circulated.

According to still another aspect of the present invention, a $CO_2$ recovering method by using a $CO_2$ absorber that brings flue gas containing $CO_2$ into contact with $CO_2$ absorbent to reduce $CO_2$ contained in the flue gas, a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, includes: measuring a $CO_2$ concentration and a volume of the flue gas; determining a volume of the $CO_2$ absorbent to be circulated for achieving a target $CO_2$ recovery rate based on the volume of the flue gas and the $CO_2$ concentration; and determining a volume of steam based on a determined volume of the $CO_2$ absorbent to be circulated.

Advantageous Effects of Invention

According to the present invention, if the absorbent concentration decreases or increases, the volume of absorbent to be circulated can be increased or decreased based on the decrease or the increase of the absorbent concentration, and the steam to be supplied into the absorber can be adjusted based on the increase or the decrease in the volume of the absorbent to be circulated. In this manner, the volume of $CO_2$ recovered per day can be maintained at a predetermined level.

DESCRIPTION OF EMBODIMENTS

Embodiments of a $CO_2$ recovering apparatus according to the present invention will now be explained in detail with reference to the accompanying drawings. The embodiments disclosed herein are not intended to limit the scope of the invention in any way.

Example 1

A $CO_2$ recovering apparatus according to a first embodiment of the present invention will now be explained with reference to FIG. 1.

Figure 1:
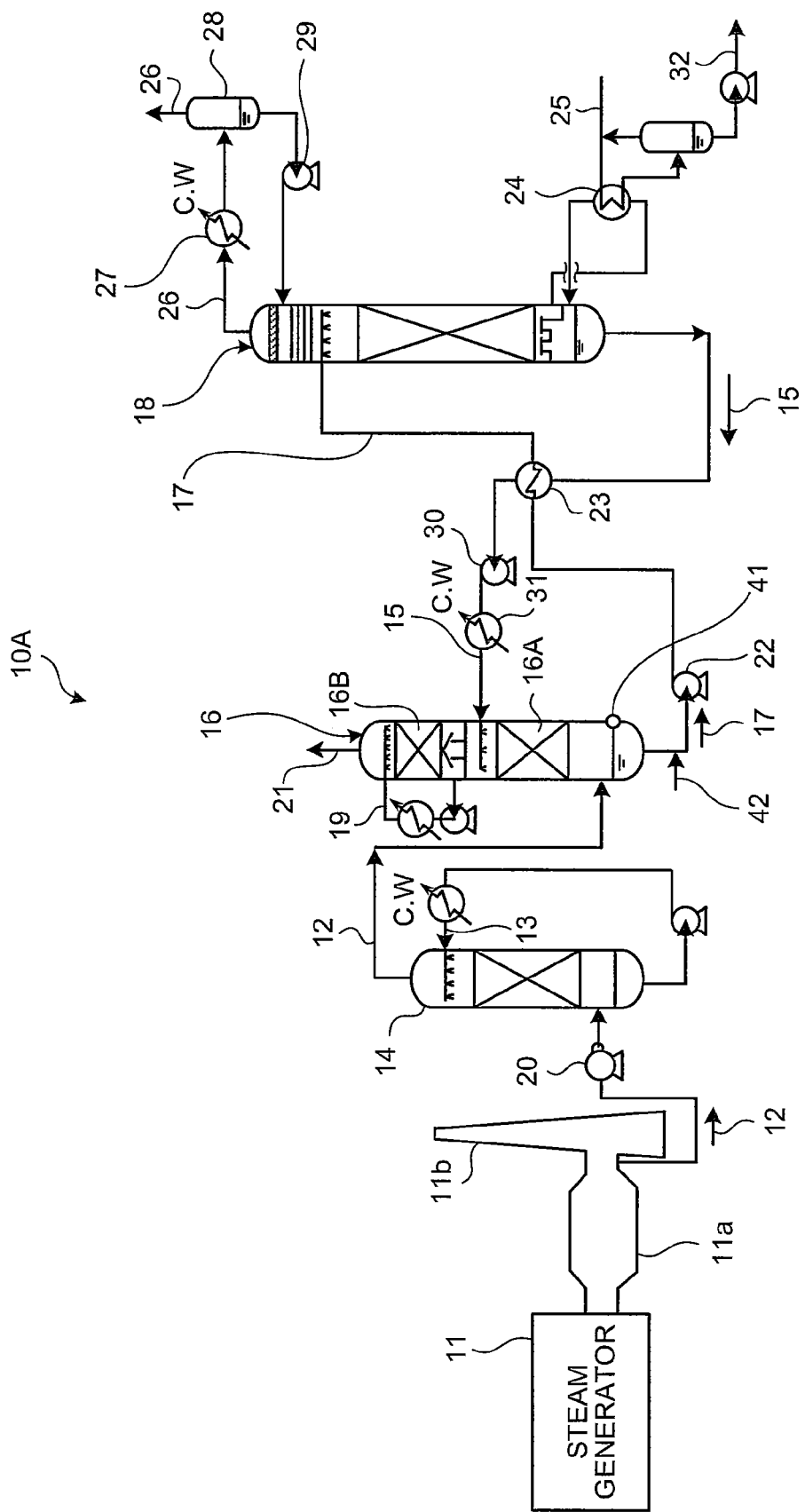
FIG. 1 is a schematic of a structure of a $CO_2$ recovering apparatus according to a first embodiment of the present invention.
Figure 9:
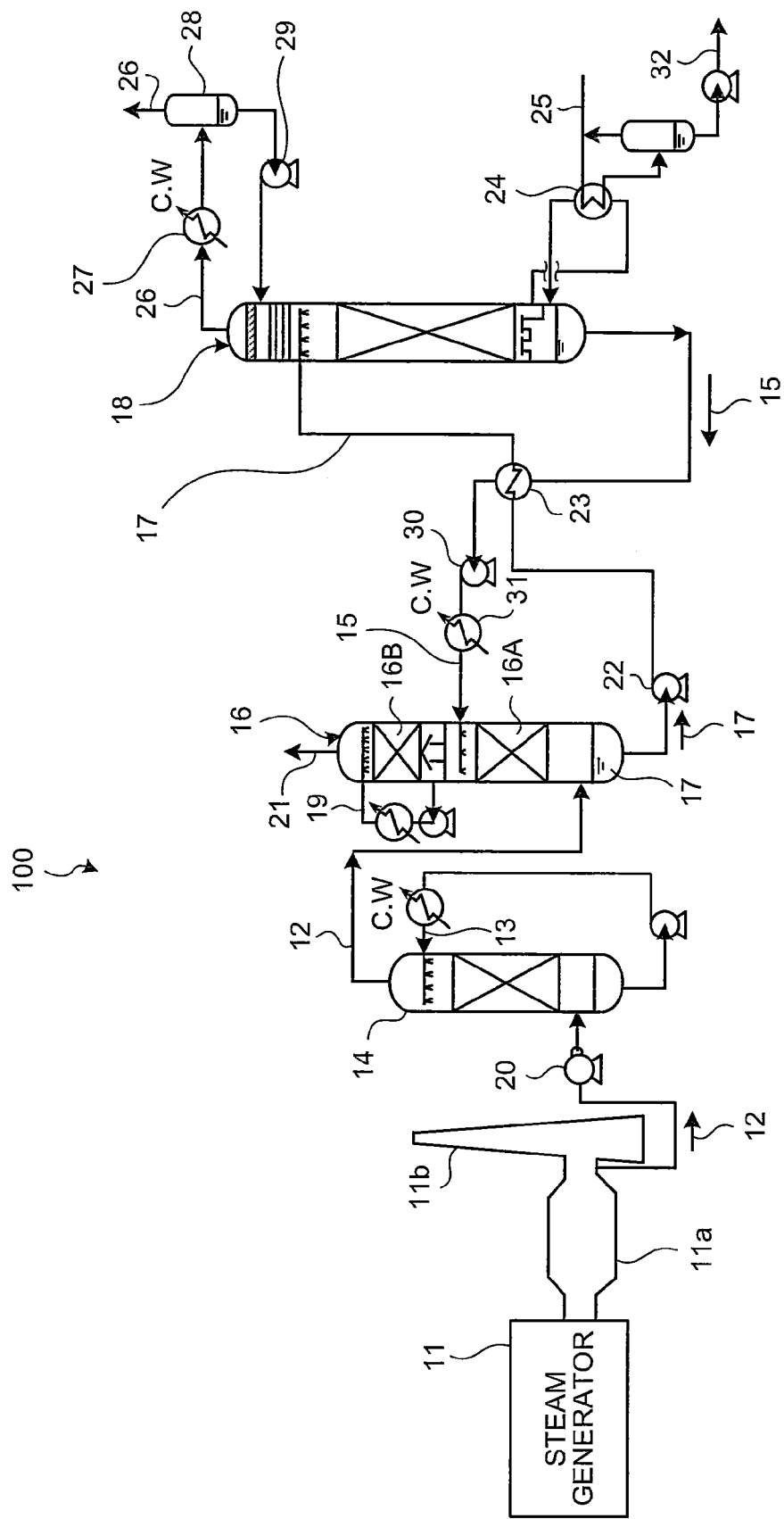
FIG. 9 is a schematic of an example of a conventional $CO_2$ recovering apparatus.

FIG. 1 is a schematic of a structure of the $CO_2$ recovering apparatus according to the first embodiment. In FIG. 1, the same elements as those shown in FIG. 9 are given the same reference signs, and redundant explanations thereof are omitted herein.

As shown in FIG. 1, a $CO_2$ recovering apparatus 10A according to the first embodiment includes: the $CO_2$ absorber 16 that brings flue gas 12 containing $CO_2$ into contact with $CO_2$ absorbent 15 to reduce the $CO_2$ contained in the flue gas 12; the regenerator 18 that reduces $CO_2$ contained in the rich solvent 17 that has absorbed $CO_2$ in the $CO_2$ absorber 16 to regenerate the rich solvent 17, so that the $CO_2$ absorbent 15 that is the lean solvent having $CO_2$ reduced in the regenerator 18 is reused in the $CO_2$ absorber 16; and a controller that controls to detect the absorbent concentration (X (volume percent)) in the $CO_2$ absorbent 15 to increase the volume of the $CO_2$ absorbent 15 to be circulated based on a decrease in the absorbent concentration, and to adjust the volume of steam to be supplied in the regenerator 18 based on the volume of the $CO_2$ absorbent 15 to be circulated. In a liquid depository at the bottom of the $CO_2$ absorber 16, a liquid level meter 41 is installed to measure the level of liquid, and the $CO_2$ absorbent 15 is supplied as a supplemental liquid 42 when required.

For example, the controller, not shown, controls to increase 100-percent absorbent circulation rate by 10 percent to bring the rate to 110 percent when the concentration of the absorbent, such as amine solvent, in the $CO_2$ absorbent 15 decreases by 10 weight percent. The controller then controls to adjust the volume of steam to be supplied in the regenerator 18 based on the volume of the absorbent to be circulated, and to increase the volume of steam to be supplied in the regenerator 18 by approximately 3 percent corresponding to the adjusted volume of steam to be supplied.

The present invention is especially suitable for a situation where the absorbent concentration in the $CO_2$ absorbent 15 cannot be measured automatically.

Figure 2:
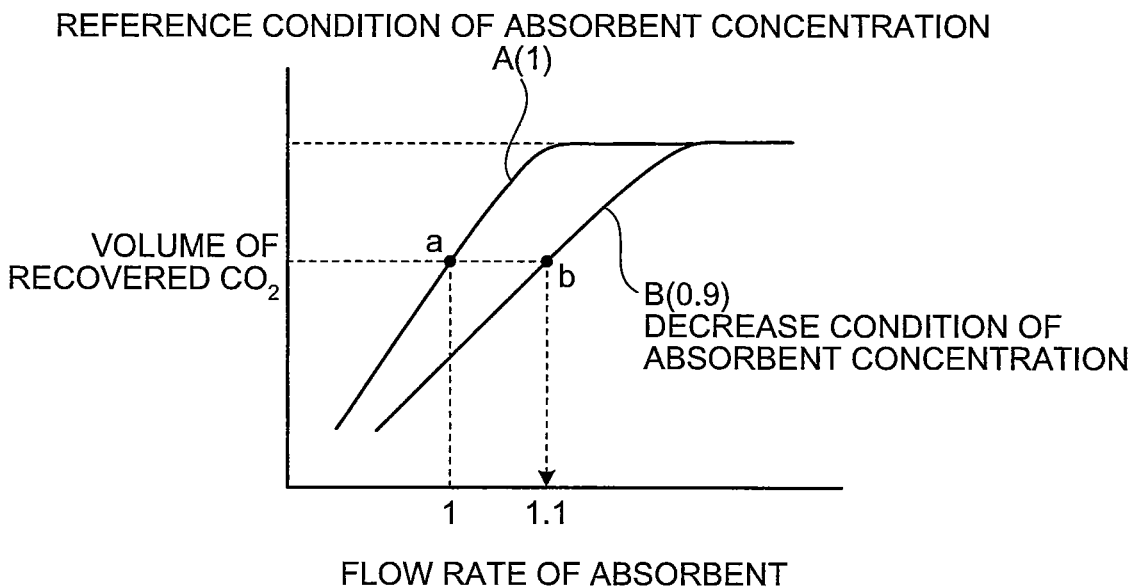
FIG. 2 is a schematic of a relationship between the flow rate of an absorbent and the volume of $CO_2$ recovered.

FIG. 2 is a schematic of a relationship between the flow rate of the absorbent and the volume of $CO_2$ recovered.

In FIG. 2, a reference condition (A) assumes that the absorbent concentration in the $CO_2$ absorbent 15 is 1 (the reference condition of the absorbent concentration). A decrease condition (B) is when the absorbent concentration in the $CO_2$ absorbent 15 decreases by 10 percent (the concentration is controlled to be 0.9 time of that in the reference condition (A)).

To keep the volume of $CO_2$ recovered at a predetermined level (e.g., 100 t/day), it is necessary to increase the circulation flow rate (the flow rate) of the absorbent by 1.1 times, that is, to increase the flow rate of the absorbent by 10 percent.

Figure 3:
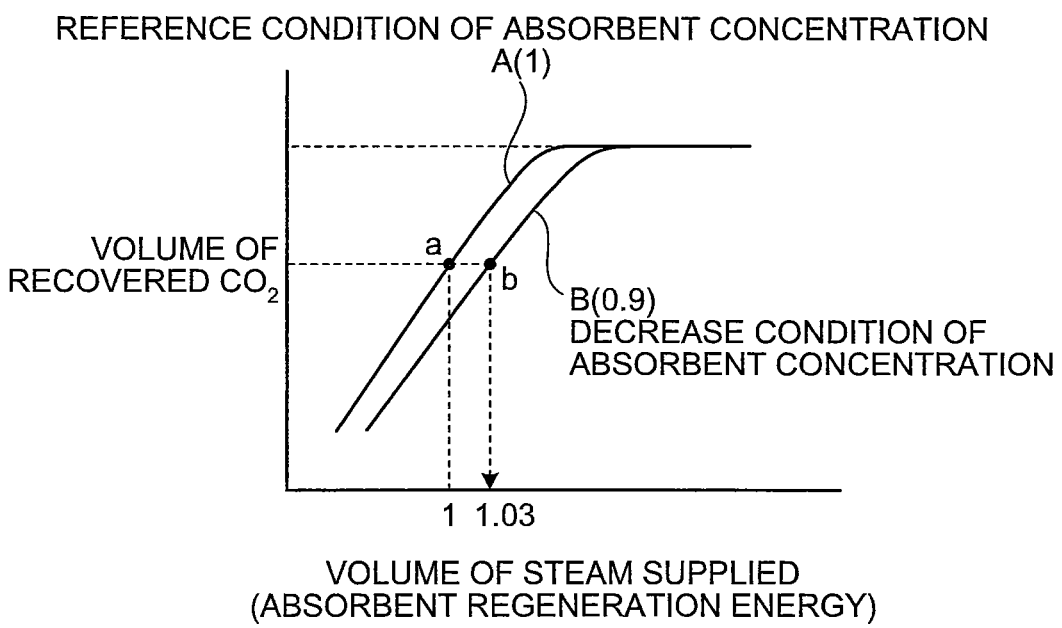
FIG. 3 is a schematic of a relationship between the volume of steam to be supplied and the volume of $CO_2$ recovered.

FIG. 3 is a schematic of a relationship between the volume of steam to be supplied (the energy required for regenerating the absorbent) and the volume of $CO_2$ recovered.

In FIG. 3, the reference condition (A) assumes that the absorbent concentration in the $CO_2$ absorbent 15 is 1; and a decrease condition (B) is when the absorbent concentration in the $CO_2$ absorbent 15 decreases by 10 percent (the concentration is controlled to decrease by 0.9 times of that in the reference condition (A)).

To keep the volume of $CO_2$ recovered at a predetermined level (e.g., 100 t/day), it is necessary to increase the volume of steam to be supplied by 1.1 times, and to increase the volume of steam to be supplied by 1.03 times (3 percent).

In this manner, it is possible to keep the volume of $CO_2$ recovered constant under the optimal condition, and to maintain the volume of $CO_2$ recovered per day at a predetermined level (e.g., 100 t/day).

As a result, it is possible to minimize the volume of steam consumed per unit volume of $CO_2$ recovered.

Alternatively, control may be performed to detect the absorbent concentration in the $CO_2$ absorbent 15; to reduce the volume of the $CO_2$ absorbent to be circulated based on an increase in the absorbent concentration; and to adjust the volume of steam to be supplied in the regenerator 18 based on the volume of the $CO_2$ absorbent to be circulated.

In this manner, by controlling to detect the absorbent concentration in the $CO_2$ absorbent, to increase or decrease the volume of the $CO_2$ absorbent to be circulated based on a decrease or an increase of the absorbent concentration, and to adjust the volume of steam to be supplied in the regenerator 18 based on the volume of the $CO_2$ absorbent to be circulated, an appropriate volume of steam can be constantly supplied.

Example 2

A $CO_2$ recovering apparatus according to a second embodiment of the present invention will now be explained with reference to FIG. 4.

Figure 4:
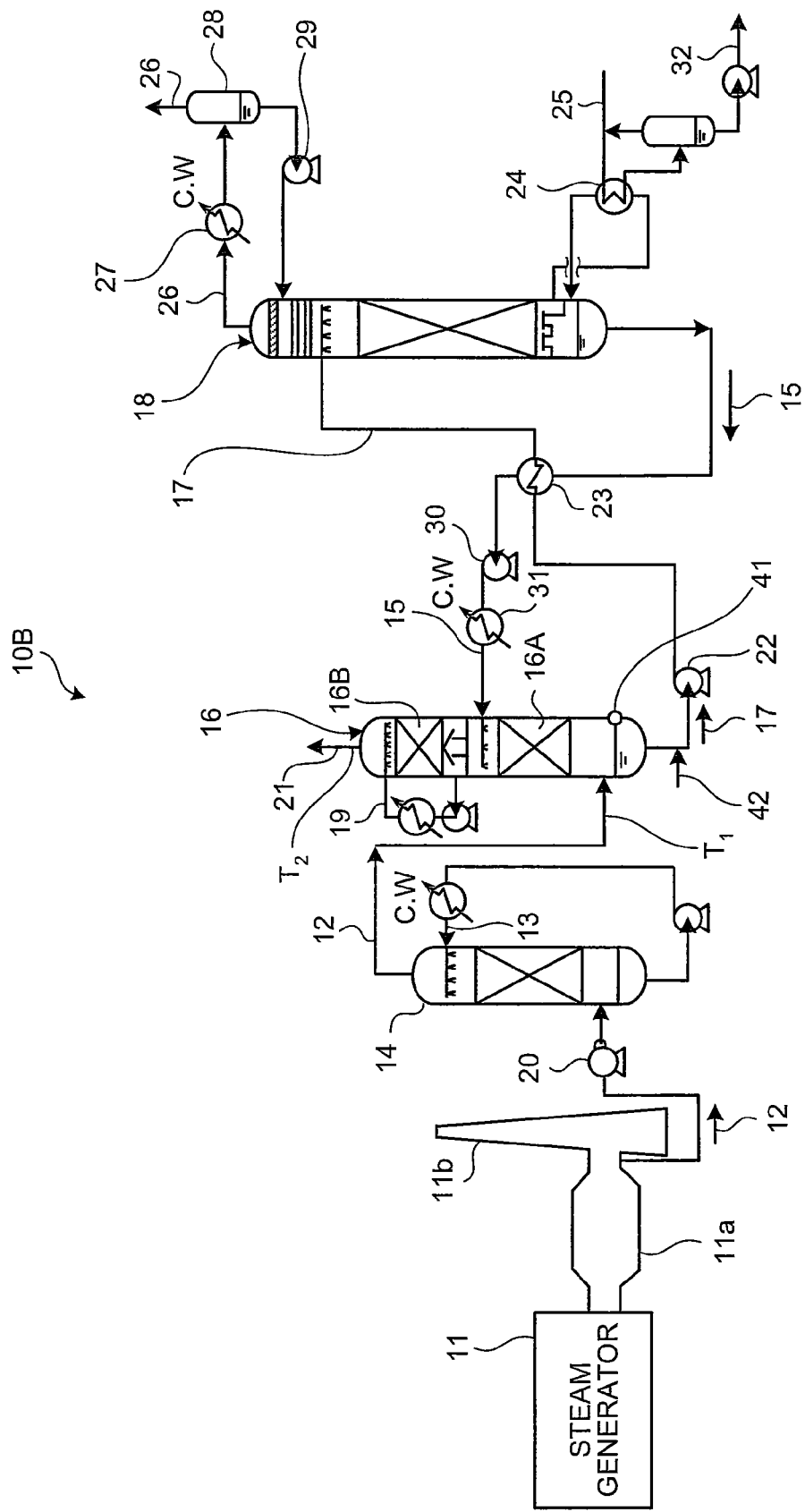
FIG. 4 is a schematic of a structure of a $CO_2$ recovering apparatus according to a second embodiment of the present invention.

FIG. 4 is a schematic of a structure of the $CO_2$ recovering apparatus according to the second embodiment. In FIG. 4, the same elements as those of the $CO_2$ recovering apparatus according to the first embodiment shown in FIG. 1 are given the same reference signs, and redundant explanations thereof are omitted herein.

As shown in FIG. 4, this $CO_2$ recovering apparatus 10B according to the second embodiment includes: the $CO_2$ absorber 16 that brings flue gas 12 containing $CO_2$ into contact with $CO_2$ absorbent 15 to reduce the $CO_2$ contained in the flue gas 12; the regenerator 18 that reduces $CO_2$ contained in the rich solvent 17 that has absorbed $CO_2$ in the $CO_2$ absorber 16 to regenerate the rich solvent 17, so that the $CO_2$ absorbent 15 that is the lean solvent having $CO_2$ reduced in the regenerator 18 is reused in the $CO_2$ absorber 16; and a controller that controls to detect the temperature of gas guided into the $CO_2$ absorber 16 ($T_1$ (e.g., approximately 40 Celsius degrees)), to increase or decrease the circulation rate of the $CO_2$ absorbent 15 based on a change in the detected temperature, and to adjust the volume of steam to be supplied in the regenerator 18 based on the volume of the $CO_2$ absorbent 15 to be circulated.

In this manner, it is possible to minimize the volume of steam consumed, while keeping the volume of $CO_2$ recovered constant.

According to the second embodiment, the temperature of the flue gas 12 at an entrance ($T_1$) is measured with a thermometer not shown. When the measured gas temperature decreases 5 Celsius degrees from a set temperature (for example, when an actual measurement decreases to 38 Celsius degrees while an initial setting is 43 Celsius degrees), the controller, not shown, controls to decrease 100-percent absorbent circulation rate by 10 percent, bringing the circulation rate down to 90 percent. The controller then adjusts the volume of steam to be supplied in the regenerator 18 based on the volume of the absorbent to be circulated (for example, if the circulation rate is decreased by 10 percent, the volume of steam to be supplied is decreased by approximately 3 percent). The reference sign $T_2$ denotes the temperature of the flue gas 21 being released out.

Figure 5:
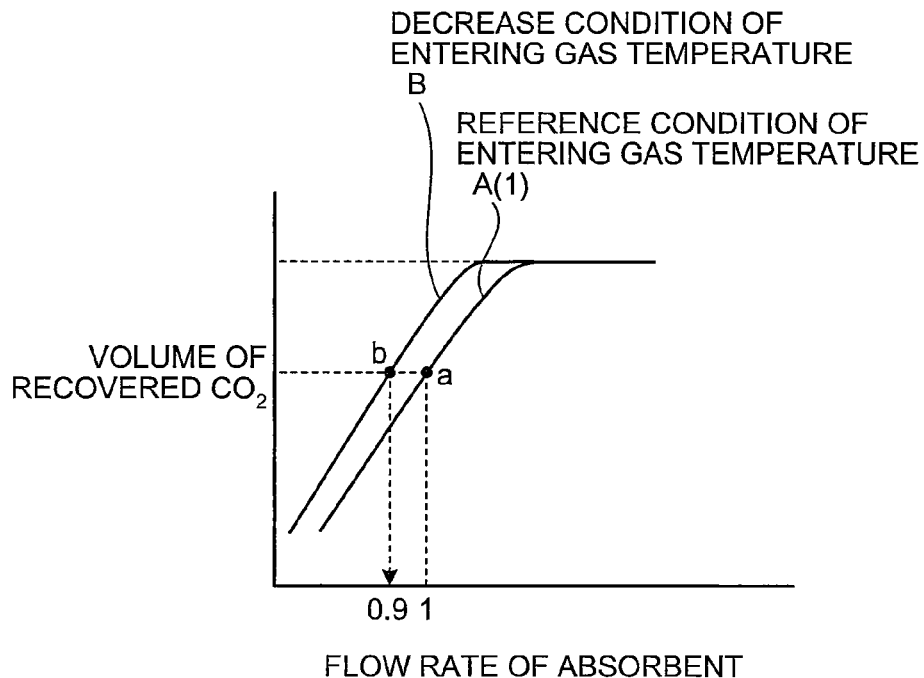
FIG. 5 is a schematic of a relationship between the flow rate of the absorbent and the volume of $CO_2$ recovered.

FIG. 5 is a schematic of a relationship between the flow rate of the absorbent and the volume of $CO_2$ recovered.

In FIG. 5, a reference condition (A) assumes that the temperature of the entering gas at the entrance is 1 (the reference condition of the entering gas temperature). A decrease condition (B) is when the entering gas temperature decreases by 5 Celsius degrees (the volume of the absorbent to be circulated is controlled to be 0.9 time of that in the reference condition (A)). This is because, the $CO_2$ absorbing ratio improves at a lower temperature.

Therefore, to maintain the volume of $CO_2$ recovered at a predetermined level (e.g., 100 t/day), the circulation flow rate of the absorbent is controlled to be 0.9 time, to decrease the flow rate of the absorbent by 10 percent.

Figure 6:
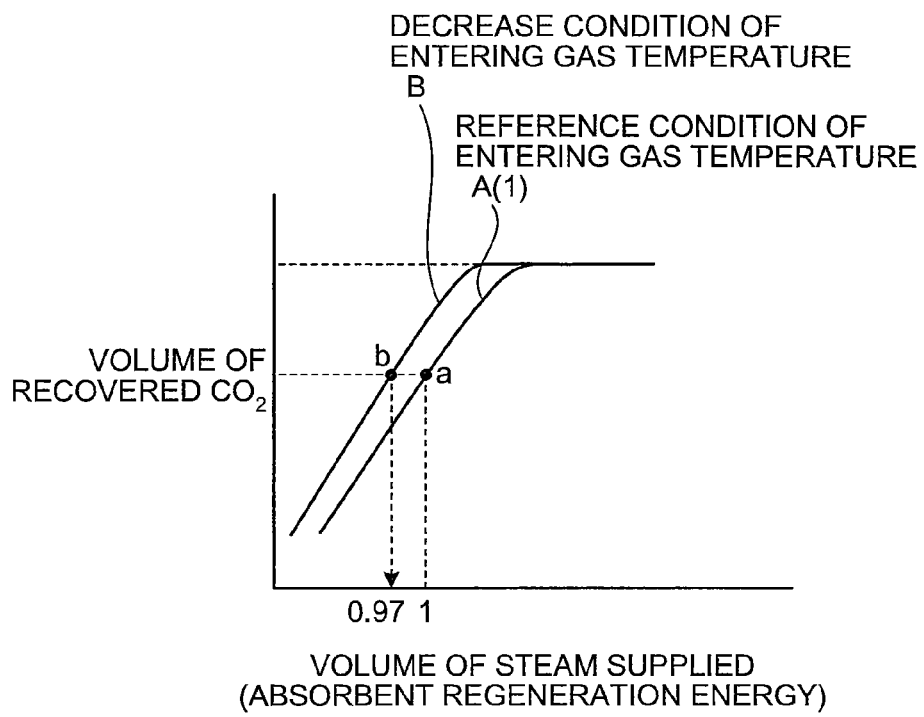
FIG. 6 is a schematic of a relationship between the volume of steam to be supplied and the volume of $CO_2$ recovered.

FIG. 6 is a schematic of a relationship between the volume of steam to be supplied (the energy required for regenerating the absorbent) and the volume of $CO_2$ recovered.

In FIG. 6, a reference condition (A) assumes that the temperature of the entering gas is 1. A decrease condition (B) is when the temperature of the entering gas decreases by 5 Celsius degrees (the concentration will be controlled to be 0.9 time of that in the reference condition (A)).

To keep the volume of $CO_2$ recovered at a predetermined level (e.g., 100 t/day), the volume of the absorbent to be circulated is controlled to be 0.9 time, and the volume of steam to be supplied is controlled to be 0.97 times (a reduction by 3 percent).

Figure 7:
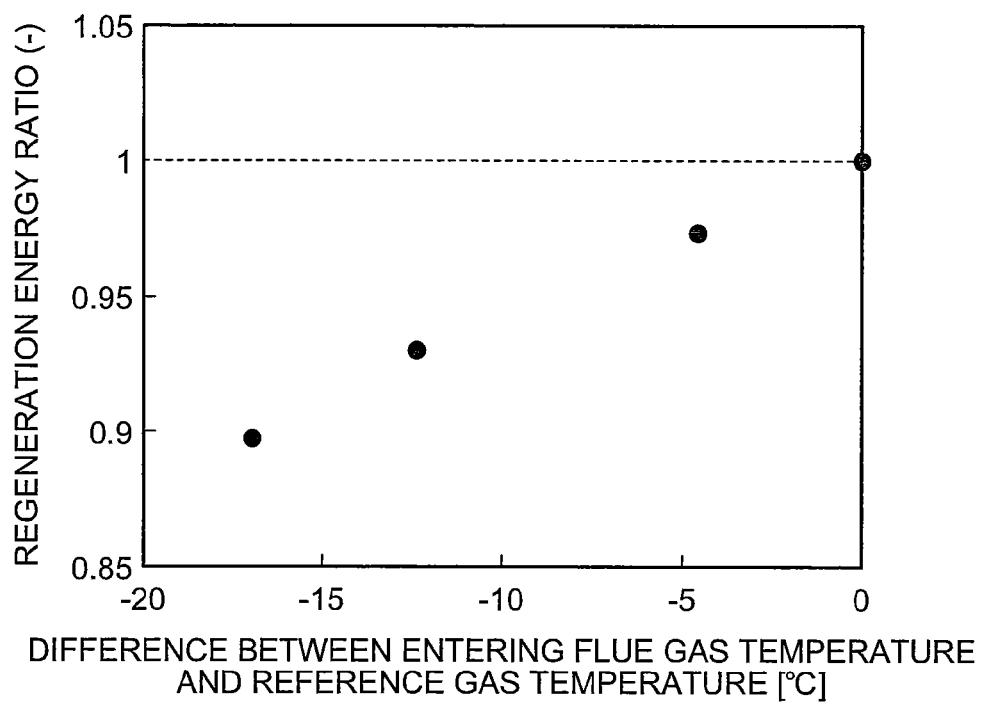
FIG. 7 is a schematic of a relationship between the difference of an entering gas temperature ($T_1$) and a reference temperature (in Celsius degrees), and a regeneration energy ratio in a regenerator.

FIG. 7 is a summary of these relationships, and a schematic of a relationship between the difference of the entering flue gas temperature ($T_1$) and the reference temperature (in Celsius degrees), and the regeneration energy ratio in the regenerator.

As shown in FIG. 7, with the temperature of the entering flue gas measured, the greater the difference between the measured temperature and the reference temperature becomes, the more the regeneration energy ratio decreases.

Therefore, to keep the volume of $CO_2$ recovered at a predetermined level (e.g., 100 t/day), when the temperature ($T_1$) of the flue gas 12 at the entrance decreases by 5 Celsius degrees, the regeneration energy ratio becomes 0.97 time of that in the reference condition.

In this manner, the $CO_2$ absorbent 15 can be regenerated with an appropriate volume of steam without supplying wasteful steam into the regenerator 18 at low temperature, and the volume of steam consumed per unit volume of $CO_2$ recovered can be minimized.

As a result, the operation can be performed at optimal energy efficiency, while maintaining the volume of $CO_2$ recovered per day at a predetermined level.

Example 3

A $CO_2$ recovering apparatus according to a third embodiment of the present invention will now be explained.

The $CO_2$ recovering apparatus according to the third embodiment has the same structure as that according to the second embodiment shown in FIG. 4; therefore, the $CO_2$ recovering apparatus according to the third embodiment will be explained with reference to FIG. 4.

The $CO_2$ recovering apparatus according to the third embodiment includes, in addition to the $CO_2$ recovering apparatus according to the second embodiment shown in FIG. 4, a controller (not shown) that controls to measure the $CO_2$ concentration (I) in the flue gas 12; to obtain the volume of the flue gas (II) for achieving a target volume of $CO_2$ recovered (100 t/day) based on the measured $CO_2$ concentration; to determine the volume of the absorbent to be circulated (III) based on the obtained volume of the flue gas; and to determine the volume of steam to be supplied (IV) based on the obtained volume of the absorbent to be circulated (III).

In this manner, an optimal operation can be ensured, and the volume of steam consumed can be optimized as much as possible, while keeping the volume of $CO_2$ recovered constant.

At this time, the $CO_2$ concentration in the flue gas 12 could fluctuate depending on combustion conditions in a steam generator 11.

As a reference, as shown in Table 1, (A) control is performed to obtain the volume of the flue gas (II) required for achieving the target volume of $CO_2$ recovered (100 t/day) based on the $CO_2$ concentration in the flue gas; to determine the volume of the absorbent to be circulated (III) based on the obtained volume of the flue gas; and to determine the volume of steam to be supplied (IV) based on the obtained volume of the absorbent to be circulated (III).

If the $CO_2$ concentration in the flue gas 12 decreases by 0.95 time of that in the reference condition, control is performed to increase the circulation flow rate of the absorbent by 1.05 times, and to change the volume of steam to be supplied in the regenerator 18 to be 1.03 times of that in the reference condition based on the increase in the volume of the absorbent to be circulated as listed in Table 1.

To consider a scenario where the flow rate of the flue gas 12 fluctuates, as shown in Table 1, (B) when the flow rate of the flue gas decreases by 0.95 time of the reference flow rate, control is performed to increase the circulation flow rate of the absorbent by 1.02 times of the reference, and to change the volume of steam to be supplied to be 1.01 times of the reference volume corresponding to the circulation flow rate.

Therefore, when the $CO_2$ concentration in the flue gas 12 fluctuates at the same time as the fluctuation of the flow rate thereof, these fluctuations need to be multiplied in the change control.

Furthermore, to consider the temperature ($T_1$) of the entering gas guided into the $CO_2$ absorber 16, as shown in Table 1, (C) when the temperature of the entering gas decreases by 5 Celsius degrees, control is performed to change the circulation flow rate of the absorbent by 0.91 time of the reference flow rate, and to decrease the volume of steam to be supplied by 0.97 time of the reference volume, that is a decrease of 3 percent.

To consider the temperature of the entering gas that is guided into the $CO_2$ absorber 19, when the temperature of the entering gas increases by 5 Celsius degrees, control is performed to increase the circulation flow rate of the absorbent by 1.09 times of the reference flow rate, and to increase the volume of steam to be supplied by 1.03 times of the reference volume, that is an increase by 3 percent.

TABLE 1

|  |  | FLOW RATE OF ABSORBENT | VOLUME OF STEAM | $CO_2$ RECOVERY RATIO | REGENERATION ENERGY PER UNIT VOLUME OF RECOVERED $CO_2$ |
|---|---|---|---|---|---|
| (A) $CO_2$ CONCENTRATION IN FLUE GAS | 1 (REFERENCE) 0.95 | 1 1.05 | 1 1.03 | 1 1.05 | 1 1.03 |
| (B) FLOW RATE OF FLUE GAS | 1 (REFERENCE) 0.95 | 1 1.02 | 1 1.01 | 1 1.05 | 1 1.01 |
| (C) ENTERING GAS TEMPERATURE | +5° C. DESIGN VALUE (REFERENCE) −5° C. | 1.09 1  0.91 | 1.03 1  0.97 | 1 1  1 | 1.03 1  0.97 |

As a result, an optimal operation can be performed for maintaining the target volume of $CO_2$ recovered per day. In this manner, it is possible to satisfy a demand for keeping the volume of $CO_2$ recovered per day equal to or higher than a predetermined level, and to provide constant quantities of products using the recovered $CO_2$.

Figure 8:
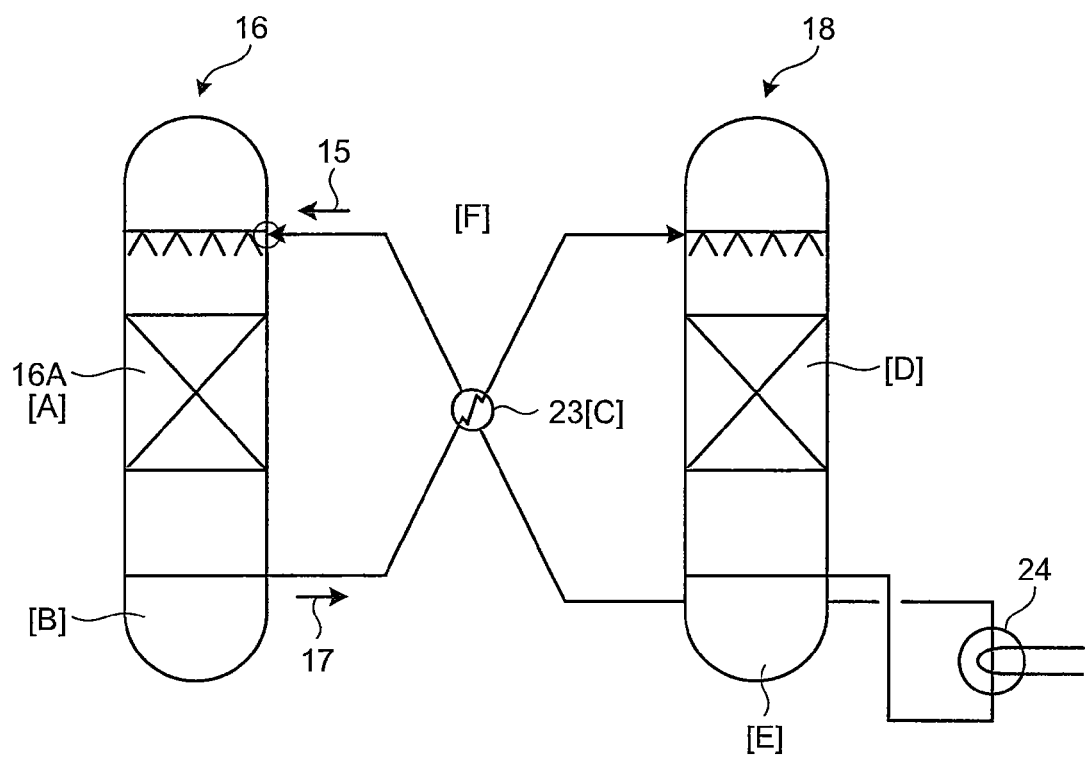
FIG. 8 is a schematic of an absorber and the regenerator included in the $CO_2$ recovering apparatus.

As shown in FIG. 8 schematically illustrating the absorber and the regenerator included in the $CO_2$ recovering apparatus, because the absorbent circulates between the $CO_2$ absorber 16 and the regenerator 18, it takes time for the absorbent that is introduced into the absorber to be circulated.

Therefore, control with a delay of the sum of the following is required: [A] the time required to pass through a filler 16A in the absorber 16 (for example, 9 minutes); [B] the time required to pass through the liquid depository in the absorber (for example, 16 minutes); [C] the time required to pass through the rich/lean solvent heat exchanger 23 (for example, 1 minute); [D] the time required to pass through a filler in the regenerator 18 (for example, 3 minutes); [E] the time required to pass through the liquid depository in the regenerator 18 (for example, 5 minutes); and [F] the time required to pass through pipes (for example, 6 minutes).

Such control with the delay taken into consideration can achieve an optimal operation.

Example 4

A $CO_2$ recovering apparatus according to a fourth embodiment of the present invention will now be explained.

The $CO_2$ recovering apparatus according to the fourth embodiment has the same structure as that according to the second embodiment shown in FIG. 4; therefore, the $CO_2$ recovering apparatus according to the fourth embodiment will be explained with reference to FIG. 4.

The $CO_2$ recovering apparatus according to the fourth embodiment includes, in addition to the $CO_2$ recovering apparatus according to the second embodiment shown in FIG. 4, a controller that controls to measure the $CO_2$ concentration (I) and the volume of the flue gas (II); to determine the volume of the absorbent to be circulated (III) for achieving the target $CO_2$ recovery ratio based on the measured volume of the flue gas and the measured $CO_2$ concentration; and to determine the volume of steam (IV) based on the determined volume of the absorbent to be circulated (III).

It is assumed in the present embodiment that the entire volume of the flue gas 12 is introduced into the system and the absorbent concentration is kept constant.

In this manner, in keeping the $CO_2$ recovery rate constant (90 percent) as a countermeasure against global warming, an optimal operation can be ensured, and the volume of steam consumed can be optimized as much as possible.

At this time, the $CO_2$ concentration in the flue gas 12 can fluctuate depending on combustion conditions of the steam generator 11.

As a reference, as shown in Table 2, (A) when the $CO_2$ concentration in the gas is constant, control is performed to obtain the volume of flue gas (II) required for achieving the target $CO_2$ recovery rate (90 percent); to determine the volume of the absorbent to be circulated (III) based on the obtained volume of the flue gas; and to determine the volume of steam to be supplied (IV) based on the obtained volume of the absorbent to be circulated (III).

If the $CO_2$ concentration in the flue gas 12 decreases by 0.95 time of that of the reference, control is performed to keep the volume of the absorbent to be circulated at the level of the reference (1.0 time), and to change the volume of steam to be supplied to be 0.99 time of that of the reference corresponding to the volume of the absorbent to be circulated. As a result, to maintain the target $CO_2$ recovery rate (90 percent), the operation can be performed with the volume of steam reduced by 1 percent, thus contributing to energy saving.

By contrast, if the $CO_2$ concentration in the flue gas 12 increases by 1.1 times of that of the reference concentration, control is performed to increase the volume of the absorbent to be circulated by 1.04 times of the reference volume, and to increase the volume of steam to be supplied by 1.06 times of the reference volume corresponding to the volume of the absorbent to be circulated. In this manner, although the volume of steam is increased by 6 percent, the target $CO_2$ recovery rate (90 percent) can be constantly achieved.

Furthermore, to consider a scenario where the flow rate of the flue gas 12 fluctuates, as shown in Table 2, (B) when the flow rate of the flue gas decreases by 0.95 time of the reference flow rate, control is performed to decrease the volume of the absorbent to be circulated by 0.94 time of the reference volume, and to change the volume of steam to be supplied to be 0.94 time of the reference volume corresponding to the volume of the absorbent to be circulated. As a result, to maintain the target $CO_2$ recovery rate (90 percent), the operation can be performed with the volume of steam reduced by 6 percent, thus contributing to energy saving.

By contrast, if the flow rate of the flue gas 12 increases by 1.1 times of that of the reference flow rate, control is performed to increase the volume of the absorbent to be circulated by 1.1 times of the reference volume, and to change the volume of steam to be supplied to be 1.1 times of the reference volume corresponding to the volume of the absorbent to be circulated. In this manner, although the volume of steam is increased by 10 percent, the target $CO_2$ recovery rate (90 percent) can be constantly achieved.

Therefore, when the $CO_2$ concentration in the flue gas 12 fluctuates at the same time as the fluctuation of the flow rate thereof, these fluctuations need to be multiplied in the change control.

Furthermore, to consider the temperature of the entering gas guided into the absorber, as shown in Table 2, (C) when the temperature of the entering gas decreases by 5 Celsius degrees, control is performed to change the volume of the absorbent to be circulated to be 0.91 time of the reference volume, and to decrease the volume of steam to be supplied by 0.97 time of the reference volume, that is a decrease of 3 percent.

To consider the temperature of the entering gas that is guided into the absorber, when the temperature of the entering gas increases by 5 Celsius degrees, control is performed to increase the volume of the absorbent to be circulated by 1.09 times of the reference volume, and to increase the volume of steam to be supplied by 1.03 times of the reference volume, that is an increase of 3 percent.

TABLE 2

|  |  | FLOW RATE OF ABSORBENT | VOLUME OF STEAM | REGENERATION ENERGY PER UNIT VOLUME OF RECOVERED $CO_2$ |
|---|---|---|---|---|
| (A) $CO_2$ CONCENTRATION IN FLUE GAS |  | 1.1 | 1.04 | 1.06 | 0.96 |
|  |  | 1 (REFERENCE) | 1 | 1 | 1 |
|  |  | 0.95 | 1.00 | 0.99 | 1.04 |
| (B) FLOW RATE OF FLUE GAS |  | 1.1 | 1.1 | 1.1 | 1.0 |
|  |  | 1 (REFERENCE) | 1 | 1 | 1 |
|  |  | 0.95 | 0.94 | 0.94 | 0.99 |
| (C) ENTERING GAS TEMPERATURE |  | +5° C. | 1.09 | 1.03 | 1.03 |
|  |  | DESIGN VALUE (REFERENCE) | 1 | 1 | 1 |
|  |  | −5° C. | 0.91 | 0.97 | 0.97 |

As a result, an optimal operation can be achieved for maintaining the target $CO_2$ recovery rate per day (for example, 90 percent). In this manner, it is possible to constantly satisfy a demand for strictly keeping the $CO_2$ recovery rate per day, further contributing to promoting the countermeasure against global warming.

As shown in FIG. 8 schematically illustrating the absorber and the regenerator included in the $CO_2$ recovering apparatus, because the absorbent circulates between the $CO_2$ absorber 16 and the regenerator 18, it takes time for the absorbent introduced into the absorber to be circulated.

Therefore, control with a delay of the sum of the following is required: [A] the time required to pass through the filler 16A in the absorber 16 (for example, 9 minutes); [B] the time required to pass through the liquid depository in the absorber (for example, 16 minutes); [C] the time required to pass through the rich/lean solvent heat exchanger 23 (for example, 1 minute); [D] the time required to pass through the filler in the regenerator 18 (for example, 3 minutes); [E] the time required to pass through the liquid depository in the regenerator 18 (for example, 5 minutes); and [F] the time required to pass through the pipes (for example, 6 minutes).

Such control with the delay taken into consideration can achieve an optimal operation.

The embodiments of the $CO_2$ recovering apparatus and the $CO_2$ recovering method according to the present invention are explained above. Examples 1 to 4 may be adopted in combination, instead of being implemented alone, to perform long-time $CO_2$ processing for flue gas with greater synergetic effects.

As described above, the $CO_2$ recovering apparatus and the $CO_2$ recovering method according to the present invention can keep the volume of $CO_2$ recovered constant under an optimal condition, and keep the volume of $CO_2$ recovered per day at a predetermined level. Therefore, the $CO_2$ recovering apparatus and the $CO_2$ recovering method according to the present invention are suited for processing $CO_2$ contained in flue gas over a long period of time.

The invention claimed is:

1. A $CO_2$ recovering apparatus including
a $CO_2$ absorber that brings flue gas containing $CO_2$ into contact with $CO_2$ absorbent to reduce $CO_2$ contained in the flue gas, and a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, the $CO_2$ recovering apparatus comprising:
a controller that controls to detect an absorbent concentration in the $CO_2$ absorbent, to increase or decrease a volume of the $CO_2$ absorbent to be circulated based on a decrease or an increase in the absorbent concentration, and to adjust a volume of steam to be supplied in the regenerator based on the volume of the $CO_2$ absorbent to be circulated,
wherein the controller controls to detect a temperature of gas guided into the $CO_2$ absorber, to decrease or increase a circulation rate of the $CO_2$ absorbent based on a change in a detected temperature; and to adjust the volume of steam to be supplied in the regenerator based on the volume of the $CO_2$ absorbent to be circulated.

2. A $CO_2$ recovering apparatus including a $CO_2$ absorber that brings flue gas containing $CO_2$ into contact with $CO_2$ absorbent to reduce $CO_2$ contained in the flue gas, and a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, the $CO_2$ recovering apparatus comprising:
a controller that controls to detect an absorbent concentration in the $CO_2$ absorbent to increase or decrease a volume of the $CO_2$ absorbent to be circulated based on a decrease or an increase in the absorbent concentration, and to adjust a volume of steam to be supplied in the regenerator based on the volume of the $CO_2$ absorbent to be circulated,
wherein the controller controls to measure a $CO_2$ concentration; to obtain a volume of the flue gas for achieving a target volume of $CO_2$ recovered based on a measured $CO_2$ concentration; to determine the volume of the $CO_2$ absorbent to be circulated based on an obtained volume of the flue gas; and to determine a volume of steam to be supplied based on an obtained volume of the $CO_2$ absorbent to be circulated.

3. The $CO_2$ recovering apparatus according to claim 1, wherein the controller controls to measure a $CO_2$ concentration and a volume of the flue gas; to determine a volume of the $CO_2$ absorbent to be circulated for achieving a target $CO_2$ recovery rate based on the volume of the flue gas and the $CO_2$ concentration; and to determine a volume of steam based on a determined volume of the $CO_2$ absorbent to be circulated.

4. A $CO_2$ recovering method by using a $CO_2$ absorber that brings flue gas containing $CO_2$ into contact with $CO_2$ absorbent to reduce $CO_2$ contained in the flue gas, and a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, A $CO_2$ recovering apparatus comprising:
controlling to detect an absorbent concentration in the $CO_2$ absorbent, to increase or decrease a volume of the $CO_2$ absorbent to be circulated based on a decrease or an increase in the absorbent concentration, and to adjust a volume of steam to be supplied in the regenerator based on the volume of the $CO_2$ absorbent to be circulated,
wherein the controlling include to detect a temperature of gas guided into the $CO_2$ absorber, to decrease or increase a circulation rate of the $CO_2$ absorbent based on a change in a detected temperature; and to adjust the volume of steam to be supplied in the regenerator based on the volume of the $CO_2$ absorbent to be circulated.

5. A $CO_2$ recovering method by using a $CO_2$ absorber that brings flue gas containing $CO_2$ into contact with $CO_2$ absorbent to reduce $CO_2$ contained in the flue gas, and a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, the $CO_2$ recovering method comprising:
controlling to detect an absorbent concentration in the $CO_2$ absorbent, to increase or decrease a volume of the $CO_2$ absorbent to be circulated based on a decrease or an increase in the absorbent concentration, and to adjust a volume of steam to be supplied in the regenerator based on the volume of the $CO_2$ absorbent to be circulated,
wherein the controlling includes to measure a $CO_2$ concentration; to obtain a volume of the flue gas for achieving a target volume of $CO_2$ recovered based on a measured $CO_2$ concentration; to determine the volume of the $CO_2$ absorbent to be circulated based on an obtained volume of the flue gas; and to determine a volume of steam to be supplied based on an obtained volume of the $CO_2$ absorbent to be circulated.

6. The $CO_2$ recovering method according to claim 4, further comprising:

measuring a $CO_2$ concentration and a volume of the flue gas; and determining a volume of steam based on a determined volume of the $CO_2$ absorbent to be circulated for achieving a target $CO_2$ recovery rate based on the volume of the flue gas and the $CO_2$ concentration.

7. A $CO_2$ recovering apparatus including a $CO_2$ absorber that brings flue gas containing $CO_2$ into contact with $CO_2$ absorbent to reduce $CO_2$ contained in the flue gas, and a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, the $CO_2$ recovering apparatus comprising:

a controller that controls to detect a temperature of gas guided into the $CO_2$ absorber, to decrease or increase a circulation rate of the $CO_2$ absorbent based on a change in a detected temperature, and to adjust a volume of steam to be supplied in the regenerator based on the volume of the $CO_2$ absorbent to be circulated.

8. A $CO_2$ recovering method by using a $CO_2$ absorber that brings flue gas containing $CO_2$ into contact with $CO_2$ absorbent to reduce $CO_2$ contained in the flue gas, and a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, the $CO_2$ recovering method comprising:

controlling to detect a temperature of gas guided into the $CO_2$ absorber, to decrease or increase a circulation rate of the $CO_2$ absorbent based on a change in a detected temperature, and to adjust a volume of steam to be supplied in the regenerator based on the volume of the $CO_2$ absorbent to be circulated.

9. A $CO_2$ recovering apparatus including a $CO_2$ absorber that brings flue gas containing $CO_2$ into contact with $CO_2$ absorbent to reduce $CO_2$ contained in the flue gas, a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, the $CO_2$ recovering apparatus comprising:

a controller that controls to measure a $CO_2$ concentration, to determine a volume of the flue gas for achieving a target volume of $CO_2$ recovered based on the $CO_2$ concentration, to determine a volume of the $CO_2$ absorbent to be circulated based on a determined volume of the flue gas, and to determine a volume of steam based on the volume of the $CO_2$ absorbent to be circulated.

10. A $CO_2$ recovering method by using a $CO_2$ absorber that brings flue gas containing $CO_2$ into contact with $CO_2$ absorbent to reduce $CO_2$ contained in the flue gas, a regenerator that reduces $CO_2$ contained in rich solvent having absorbed $CO_2$ in the $CO_2$ absorber to regenerate the rich solvent, so that the $CO_2$ absorbent that is lean solvent having $CO_2$ reduced in the regenerator is reused in the $CO_2$ absorber, the $CO_2$ recovering method comprising:

controlling to measure a $CO_2$ concentration, to determine a volume of the flue gas for achieving a target volume of $CO_2$ recovered based on the $CO_2$ concentration, to determine a volume of the $CO_2$ absorbent to be circulated based on a determined volume of the flue gas, and to determine a volume of steam based on the volume of the $CO_2$ absorbent to be circulated.

\* \* \* \* \*